United States Patent
Kim et al.

(10) Patent No.: US 10,590,260 B2
(45) Date of Patent: Mar. 17, 2020

(54) PLASTICIZER COMPOSITION, RESIN COMPOSITION, AND METHODS FOR PREPARING SAME

(71) Applicant: LG CHEM, LTD., Seoul (KR)

(72) Inventors: Hyun Kyu Kim, Daejeon (KR); Mi Yeon Lee, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

(*) Notice: Subject to any disclaimer, the term of this patent is extended or adjusted under 35 U.S.C. 154(b) by 121 days.

(21) Appl. No.: 15/567,912

(22) PCT Filed: Oct. 27, 2016

(86) PCT No.: PCT/KR2016/012162
§ 371 (c)(1),
(2) Date: Oct. 19, 2017

(87) PCT Pub. No.: WO2017/074056
PCT Pub. Date: May 4, 2017

(65) Prior Publication Data
US 2018/0112062 A1 Apr. 26, 2018

(30) Foreign Application Priority Data
Oct. 27, 2015 (KR) .................. 10-2015-0149653

(51) Int. Cl.
| | | |
|---|---|---|
| *C08K 5/1515* | (2006.01) | |
| *C08K 5/12* | (2006.01) | |
| *C08K 5/00* | (2006.01) | |
| *C08K 5/10* | (2006.01) | |
| *C08L 101/00* | (2006.01) | |
| *C08K 5/11* | (2006.01) | |

(52) U.S. Cl.
CPC .............. *C08K 5/1515* (2013.01); *C08K 5/00* (2013.01); *C08K 5/10* (2013.01); *C08K 5/11* (2013.01); *C08K 5/12* (2013.01); *C08L 101/00* (2013.01); *C08K 5/0016* (2013.01)

(58) Field of Classification Search
CPC ........... C08K 5/1515; C08K 5/12; C08K 5/11
USPC ........................................................ 524/114
See application file for complete search history.

(56) References Cited

U.S. PATENT DOCUMENTS

| | | |
|---|---|---|
| 2007/0037926 A1 | 2/2007 | Olsen et al. |
| 2007/0135562 A1 | 6/2007 | Freese et al. |
| 2013/0066000 A1* | 3/2013 | Freese ................. C08J 3/18 524/285 |
| 2013/0137789 A1 | 5/2013 | Olsen et al. |
| 2013/0274389 A1 | 10/2013 | Howard |
| 2013/0317152 A1 | 11/2013 | Becker et al. |
| 2015/0010279 A1 | 1/2015 | Sakabe et al. |
| 2015/0078716 A1 | 3/2015 | Sakabe et al. |
| 2015/0210827 A1* | 7/2015 | Yontz ............... C08K 5/1565 521/90 |
| 2015/0218312 A1* | 8/2015 | Wu ................... C07H 15/04 424/59 |
| 2017/0081501 A1 | 3/2017 | Kim et al. |
| 2018/0142078 A1 | 5/2018 | Kim et al. |

FOREIGN PATENT DOCUMENTS

| | | |
|---|---|---|
| CN | 1056507 A | 11/1991 |
| CN | 101326230 A | 12/2008 |
| CN | 102643373 A | 8/2012 |
| CN | 102848658 A | 1/2013 |
| CN | 102925013 A * | 2/2013 |
| CN | 103788406 A | 5/2014 |
| CN | 103013425 B | 6/2014 |
| EP | 3130631 A1 | 2/2017 |
| EP | 3275930 A1 | 1/2018 |
| KR | 10-2014-0005908 A | 1/2014 |
| WO | 2007/065675 A1 | 6/2007 |
| WO | 2012/027038 A2 | 3/2012 |
| WO | 2012/069278 A1 | 5/2012 |
| WO | 2013/004265 A1 | 1/2013 |
| WO | 2016/129876 A1 | 8/2016 |

OTHER PUBLICATIONS

Translation of CN 102925013, Feb. 13, 2013. (Year: 2013).*

* cited by examiner

*Primary Examiner* — Hui H Chin

(74) *Attorney, Agent, or Firm* — Dentons US LLP

(57) ABSTRACT

The present invention relates to a plasticizer composition, a resin composition, and methods for preparing the same. The present invention can provide: a plasticizer capable of improving properties, such as plasticization efficiency, transitivity, tensile strength, elongation, and tension/elongation retention, required for compound treatment when a resin composition is used as a plasticizer, by improving poor properties caused due to structural limitations; and a resin composition containing the same.

15 Claims, No Drawings

PLASTICIZER COMPOSITION, RESIN COMPOSITION, AND METHODS FOR PREPARING SAME

CROSS-REFERENCE TO RELATED APPLICATION

This application is a National Stage Application of International Application No. PCT/KR2016/012162 filed on Oct. 27, 2016, which claims the benefit of Korean Patent Application No. 10-2015-0149653 filed on Oct. 27, 2015, all of which are hereby incorporated by reference in their entirety for all purposes as if fully set forth herein.

TECHNICAL FIELD

The present invention relates to a plasticizer composition, a resin composition, and a method of preparing the same.

BACKGROUND ART

Generally, a plasticizer forms an ester through a reaction between an alcohol and a polycarboxylic acid such as phthalic acid or adipic acid. In addition, there has been continuing research on compositions of plasticizers that can replace phthalate-based plasticizers such as terephthalate-based, adipate-based, and other polymer-based plasticizers in consideration of domestic and international regulations on phthalate-based plasticizers, which are harmful to human bodies.

Meanwhile, in compound industries requiring high heat resistance and low volatile loss as main desired physical properties, suitable plasticizers should be used in consideration of the desired physical properties. In the case of polyvinyl chloride (PVC) compounds used for electric wires and cables, additives such as a plasticizer, a stabilizer, and a pigment are mixed with a PVC resin according to characteristics of the PVC compounds required for corresponding specifications, such as tensile strength, an elongation rate, plasticization efficiency, volatile loss, tension retention and elongation retention, and the like.

Recently, because diisodecyl phthalate (DIDP), which is currently typically used as a compound for electric wires and automotive fabrics in the compound industry, is an observational chemical as an endocrine disruptor and its use is being regulated due to environmental issues, there is an increasing demand for the development of environmentally-friendly products for replacing DIDP. In order to replace these products, it is necessary to develop a novel product having a level of quality equal to or higher than those of DIDP.

Accordingly, research has been conducted on the development of a novel environmentally-friendly plasticizer composition product having more excellent properties than those of DIDP to ensure a vinyl chloride-based resin composition which is free from environmental issues and excellent in terms of quality.

PRIOR-ART DOCUMENTS

Patent Documents

WO 2007/065675 A

DISCLOSURE

Technical Problem

Therefore, during research on plasticizers, the present inventors developed a plasticizer composition capable of significantly improving properties of a polyvinyl chloride (PVC) resin composition, and thus completed the present invention.

That is, the present invention is directed to providing a plasticizer capable of improving properties required when the plasticizer is used as a plasticizer for a resin composition, such as hardness, tension retention and elongation retention, migration resistance, volatile loss, and the like, a method of preparing the same, and a resin composition including the same.

Technical Solution

According to an embodiment of the present invention, there is provided a plasticizer composition which includes an epoxidized oil; and a citrate-based material represented by Chemical Formula 1 below, wherein a weight ratio of the epoxidized oil and the citrate-based material is 99:1 to 1:99.

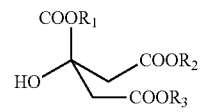

[Chemical Formula 1]

In Chemical Formula 1, $R_1$ to $R_3$ are each independently the same as or different from each other and an alkyl group having 8 to 12 carbon atoms.

According to another embodiment of the present invention, there is provided a method of preparing a plasticizer composition, which includes preparing an epoxidized oil and a citrate-based material; and blending the epoxidized oil and the citrate-based material at a weight ratio of 99:1 to 1:99 to obtain a plasticizer composition.

According to still another embodiment of the present invention, there is provided a resin composition which includes 100 parts by weight of a resin; and 5 to 150 parts by weight of the above-described plasticizer composition.

Advantageous Effects

A plasticizer composition according to an embodiment of the present invention can provide excellent properties such as plasticization efficiency, tensile strength, an elongation rate, migration resistance, volatilization resistance, and the like when used in a resin composition.

MODES OF THE INVENTION

Example

Hereinafter, embodiments will be described in detail for promoting an understanding of the present invention. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Preparation Example 1: Preparation of ESO

Epoxidized soybean oil (ESO; commercially available from SAJO) was used.

Preparation Example 2: Preparation of TEHC 384 g of citric acid and 1,014 g of 2-ethylhexanol were used as reaction components to finally obtain 1,029 g of tri-2-ethylhexyl citrate (TEHC) (yield: 98%).

Preparation Example 3: Preparation of TINC 384 g of citric acid and 1,296 g of isononanol were used as reaction components to finally obtain 1,119 g of tri-isononyl citrate (TINC) (yield: 98%).

The compounds according to Preparation Examples 1 to 3 were used to prepare examples and comparative examples as follows.

TABLE 1

|   | Epoxidized oil | Citrate-based material | Mixing weight ratio |
|---|---|---|---|
| Example 1 | Preparation Example 1 (ESO) | Preparation Example 2 (TEHC) | 9:1 |
| Example 2 | Preparation Example 1 (ESO) | Preparation Example 2 (TEHC) | 7:3 |
| Example 3 | Preparation Example 1 (ESO) | Preparation Example 2 (TEHC) | 5:5 |
| Example 4 | Preparation Example 1 (ESO) | Preparation Example 2 (TEHC) | 3:7 |
| Example 5 | Preparation Example 1 (ESO) | Preparation Example 2 (TEHC) | 1:9 |
| Example 6 | Preparation Example 1 (ESO) | Preparation Example 3 (TINC) | 7:3 |
| Example 7 | Preparation Example 1 (ESO) | Preparation Example 3 (TINC) | 5:5 |

TABLE 2

|   | Epoxidized oil | Citrate-based material | Mixing weight ratio |
|---|---|---|---|
| Comparative Example 1 | Preparation Example 1 (ESO) | TBC | 5:5 |
| Comparative Example 2 | Preparation Example 1 (ESO) | ATBC | 5:5 |
| Comparative Example 3 | Preparation Example 1 (ESO) | ATEHC | 5:5 |
| Comparative Example 4 | Preparation Example 1 (ESO) | — | — |
| Comparative Example 5 | — | Preparation Example 2 (TEHC) | — |

<Test items>

Measurement of Hardness

According to ASTM D2240, Shore hardness was measured at 25° C. under 3T and 10 s conditions.

Measurement of Tensile Strength

According to ASTM D638, each specimen was pulled at a cross head speed of 200 mm/min (1T) using a tester, U.T.M, (Manufacturer; Instron, Model No.; 4466), and a point at which the specimen was broken was then measured. The tensile strength was calculated as follows:

Tensile strength (kgf/mm$^2$)=Load value (kgf)/Thickness (mm)×Width (mm)

Measurement of Elongation Rate

According to ASTM D638, each specimen was pulled at a cross head speed of 200 mm/min (1T) using the U.T.M, and a point at which the specimen was broken was then measured. The elongation rate was calculated as follows:

Elongation rate (%)=[Length after elongation/Initial length]×100

Measurement of Migration Loss

A specimen having a thickness of 2 mm or more was obtained according to KSM-3156, PS plates were attached to both sides of the specimen, and then a load of 2 kgf/cm$^2$ was applied thereto. The specimen was kept in a forced convection oven (80° C.) for 72 hours, then taken out of the oven, and cooled at room temperature for 4 hours. Thereafter, the PS plates attached to both sides of the specimen were removed, weights before and after being kept in the oven were measured, and thus a migration loss was calculated by the equation as follows.

Migration loss (%)=[(Initial weight of specimen at room temperature−Weight of specimen after being kept in oven)/Initial weight of specimen at room temperature]×100

Measurement of Volatile Loss

The specimen thus prepared was processed at 121° C. for 168 hours, and then a weight of the specimen was measured.

Volatile loss (%)=[(Initial weight of specimen−Weight of specimen after being processed)/Initial weight of specimen]×100

Stress Test

A stress test was performed by leaving the specimen in a bent state at room temperature for a predetermined period of time, and then a degree of migration (a degree of extrusion) was observed and expressed as a numerical value. In the test, values closer to 0 indicate excellent characteristics.

Measurement of Tension Retention and Elongation Retention

In the measurement of tension retention and elongation retention, each specimen was heated at a predetermined temperature for a predetermined period of time, and then tension and an elongation rate remaining in the specimen were measured. Measurement methods thereof are the same as the above measurement methods of tensile strength and an elongation rate.

Experimental Example 1: Evaluation of Properties of Resin Specimen

Each mixed plasticizer composition according to examples and comparative examples listed in Tables 1 and 2 was used to prepare a specimen.

The specimen was prepared with reference to ASTM D638. With respect to 100 parts by weight of a polyvinyl chloride (PVC) resin (LS100), 50 parts by weight of each plasticizer composition prepared in examples and comparative examples, 5 parts by weight of RUP-144 (commercially available from ADEKA KOREA) as a stabilizer, 40 parts by weight of Omya 1T (commercially available from Omya) as a filler, and 0.3 parts by weight of St-A (commercially available from ISU CHEMICAL) as a lubricant were mixed at 98° C. and 700 rpm. Afterward, the resulting mixture was subjected to roll-milling at 160° C. for 4 minutes using a rolling mill, and pressed for 2.5 minutes (low pressure) and for 2 minutes (high pressure) at 180° C. using a press, thereby preparing a specimen.

Properties of each specimen were evaluated by the test items, results of which are shown in Table 3 below.

TABLE 3

|  | Hardness (Shore "A") | Tensile strength (kg/cm$^2$) | Tension retention (%) | Elongation rate (%) | Elongation retention (%) | Migration loss (%) | Volatile loss (%) | Cold resistance (° C.) | Stress (168 hrs) |
|---|---|---|---|---|---|---|---|---|---|
| Example 1 | 94.0 | 202.8 | 95.4 | 280.6 | 95.4 | 0.95 | 0.50 | −20.0 | 0 |
| Example 2 | 94.0 | 205.3 | 96.8 | 297.6 | 99.5 | 0.77 | 0.54 | −23.0 | 0 |
| Example 3 | 94.0 | 206.8 | 97.0 | 296.7 | 98.2 | 0.50 | 0.60 | −23.0 | 0 |
| Example 4 | 94.5 | 204.5 | 97.2 | 292.4 | 97.1 | 0.88 | 0.71 | −24.0 | 0 |
| Example 5 | 95.5 | 201.6 | 96.8 | 287.5 | 97.4 | 0.90 | 1.24 | −25.0 | 0 |
| Example 6 | 96.5 | 225.6 | 99.8 | 289.6 | 98.7 | 0.55 | 0.45 | −22.0 | 0 |
| Example 7 | 95.5 | 230.4 | 102.3 | 298.6 | 99.2 | 0.48 | 0.40 | −21.0 | 0 |
| Comparative Example 1 | 92.4 | 189.7 | 88.1 | 265.1 | 80.8 | 2.47 | 7.85 | −22.0 | 0 |
| Comparative Example 2 | 93.5 | 188.7 | 90.1 | 264.1 | 81.2 | 2.56 | 7.24 | −22.0 | 0 |
| Comparative Example 3 | 95.5 | 190.2 | 84.6 | 257.8 | 86.4 | 0.78 | 0.64 | −22.0 | 0.5 |
| Comparative Example 4 | 94.0 | 200.1 | 93.4 | 270.6 | 88.7 | 1.23 | 0.51 | −10.0 | 1.0 |
| Comparative Example 5 | 96.5 | 188.6 | 97.0 | 271.3 | 86.9 | 1.20 | 1.68 | −23.0 | 1.5 |

Referring to Table 3, it can be seen that the specimens according to Examples 1 to 7 exhibited a significant improvement in volatile loss and migration, a significant difference in an effect on tension retention or elongation retention, and a significant difference in basic mechanical properties such as tensile strength and an elongation rate compared to the specimens according to Comparative Examples 1 and 2, in which citrate having a small number of carbon atoms was used.

In addition, it can be seen that the specimens according to Examples 1 to 7 exhibited a significant improvement in plasticization efficiency, tensile strength, an elongation rate, tension retention, and elongation retention compared to the specimen according to Comparative Example 3, in which citrate to which an acetyl group is bonded was used. In a case in which either an epoxidized oil or a citrate-based material was used, it was confirmed that Comparative Example 4 exhibited particularly poor cold resistance, and Comparative Example 5 exhibited significantly low plasticization efficiency, tensile strength, an elongation rate, elongation retention, and stress migration compared to the specimens according to Examples.

From the above-described results, it can be seen that when a plasticizer prepared by mixing an epoxidized oil and a citrate-based material having 8 or more carbon atoms is used, a resin which exhibits improved plasticization efficiency, migration, and volatile loss even while maintaining basic mechanical properties at an excellent level may be provided, and cold resistance may further be ensured.

Experimental Example 2: Evaluation of Properties of Resin Specimen Prepared Using Plasticizer Composition Further Including Phthalate-Based Material As shown in Table 4 below, each plasticizer composition further including a terephthalate-based material was prepared, and a specimen was prepared using the plasticizer composition in the same manner as in Experimental Example 1. Properties thereof were evaluated in the same manner, results of which are shown in Table 5 below.

TABLE 4

|  | Plasticizer | Separate plasticizer | Content of separate plasticizer (based on 100 parts by weight of plasticizer) |
|---|---|---|---|
| Example 8 | Example 5 | DPHP | 50 parts by weight |
| Example 9 | Example 4 | DPHP | 100 parts by weight |
| Example 10 | Example 3 | DINP | 66 parts by weight |
| Example 11 | Example 3 | DIDP | 25 parts by weight |
| Comparative Example 6 | Example 2 | DPHP | 5 parts by weight |
| Comparative Example 7 | Example 2 | DPHP | 120 parts by weight |

TABLE 5

|  | Hardness (Shore "A") | Tensile strength (kg/cm$^2$) | Tension retention (%) | Elongation rate (%) | Elongation retention (%) | Migration loss (%) | Volatile loss (%) | Cold resistance (° C.) | Stress (168 hrs) |
|---|---|---|---|---|---|---|---|---|---|
| Example 8 | 93.1 | 223.8 | 98.7 | 290.7 | 97.5 | 0.88 | 0.54 | −26.0 | 0 |
| Example 9 | 93.5 | 245.7 | 98.3 | 290.0 | 98.6 | 0.57 | 0.52 | −26.0 | 0 |
| Example 10 | 92.2 | 237.8 | 96.8 | 295.1 | 99.7 | 0.32 | 0.61 | −28.0 | 0 |
| Example 11 | 92.6 | 245.7 | 99.8 | 297.5 | 101.2 | 0.38 | 0.48 | −29.5 | 0 |
| Comparative Example 6 | 94.0 | 205.8 | 97.0 | 292.6 | 98.5 | 0.80 | 0.55 | −23.0 | 0 |
| Comparative Example 7 | 95.0 | 203.1 | 94.5 | 284.6 | 88.7 | 0.98 | 1.69 | −24.0 | 0 |

Referring to Table 5, the effect exhibited when a phthalate-based material is added as a separate plasticizer can be seen. That is, it can be confirmed that plasticization efficiency, tensile strength, and migration resistance were particularly excellent, and it can be clearly seen that cold resistance may be further compensated. Also, it can be confirmed that, when a separate plasticizer was added at a too small amount of 5 parts by weight or at a too large amount of 120 parts by weight, there was little improvement effects or properties were rather degraded.

While embodiments have been described above in detail, the scope of embodiments of the present invention is not limited thereto, but encompasses several modifications and improvements by those skilled in the art using basic concepts of embodiments of the present invention defined by the appended claims.

MODE FOR INVENTION

Hereinafter, the present invention will be described in detail.

First, the present invention has a technical feature in providing a plasticizer composition capable of improving poor properties caused by structural limitations.

According to an embodiment of the present invention, there is provided a plasticizer composition including an epoxidized oil. Specifically, the epoxidized oil may be applied at a content of 1 to 99 wt %, 10 to 99 wt %, 20 to 99 wt %, 30 to 95 wt %, or 40 to 90 wt % based on the total weight of the composition. Also, the epoxidized oil may be applied at a content of 1 to 50 wt %, 10 to 50 wt %, 10 to 40 wt %, 25 to 50 wt %, or 25 to 40 wt %.

The epoxidized oil may be, for example, one or more selected from the group consisting of epoxidized soybean oil (ESO), epoxidized castor oil, epoxidized linseed oil (ELO), epoxidized palm oil, epoxidized stearate, epoxidized oleate, epoxidized tall oil, and epoxidized linoleate.

Preferably, the epoxidized oil may be one or more selected from the group consisting of epoxidized soybean oil (ESO) and epoxidized linseed oil (ELO).

When the above-described epoxidized oil is used in a plasticizer, the plasticizer may exhibit an improvement in tension/elongation retention, migration, volatile loss, and plasticization efficiency compared to existing products, have relatively excellent economic feasibility compared to other products capable of improving properties at the same level, and thus be appropriately used as an improved plasticizer.

In addition, according to an embodiment of the present invention, the plasticizer composition may further include a citrate-based material. In this case, it may be appropriate for the citrate-based material to be included to be a citrate-based material having relatively high molecular weight that may be represented by Chemical Formula 1 below.

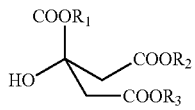

[Chemical Formula 1]

In Chemical Formula 1, $R_1$ to $R_3$ are each independently the same as or different from each other and an alkyl group having 8 to 12 carbon atoms.

For example, it is preferable for an ester alkyl group of the citrate-based material to have 8 or more carbon atoms, and tri(2-ethylhexyl) citrate, triisononyl citrate, triisodecyl citrate, tri(2-propylheptyl) citrate, or the like may be applied.

When the citrate-based compound having a low molecular weight, that is, less than 8 carbon atoms, is used as described above, an effect of adding a citrate-based material may be not exhibited due to volatility of the citrate-based material, and loss properties such as migration and volatile loss may be deteriorated as the citrate-based material is volatized. Therefore, tri(2-ethylhexyl) citrate, triisononyl citrate, or the like which has a predetermined molecular weight or more is preferably used.

In addition, when an alkyl group, which is bonded to an ester group of citrate, has greater than 12 carbon atoms and thus a molecular weight is excessively increased, properties such as an absorption rate, plasticization efficiency, and the like may be degraded.

Meanwhile, a hybrid or non-hybrid alkyl-substituted citrate compound such as trialkyl citrate, di-n-alkyl-m-alkyl citrate, or the like may be used. When an acetyl group is present in the citrate-based material, properties of the plasticizer, particularly, processability and a gelling property, may be deteriorated according to degradation of plasticization efficiency, and economic feasibility may be degraded such as a cost increase caused by problems of an additional manufacturing process being performed and an additional treatment facility due to the generation of waste acetic acid.

In other words, when an acetyl citrate compound having a hydrogen atom of the remaining hydroxyl group substituted with an acetyl group in addition to the three ester groups is used as the citrate-based material, various aspects such as marketability, economic feasibility, and properties thereof may deteriorate due to problems of degradation of plasticization efficiency, an addition of an increasing amount of a plasticizer for overcoming the degradation, and a resulting increase in product costs.

In this case, the plasticizer composition may include the epoxidized oil and the citrate-based material at a weight ratio of 99:1 to 1:99, 99:1 to 5:95, 99:1 to 10:90, 99:1 to 15:85, or 99:1 to 20:80, and preferably, 95:5 to 20:80 or 90:10 to 25:75.

In addition, in some cases, it is preferable that an excessive amount of the citrate-based material be included such as 50:50 to 10:90, 40:60 to 10:90, 50:50 to 15:85, 50:50 to 25:75, or 40:60 to 25:75. As such, when the citrate-based material is used in combination with the epoxidized oil, cold resistance, which is a problem of the epoxidized oil, may be partially improved.

The plasticizer composition includes the epoxidized oil and the citrate-based material, and may also further include a phthalate-based compound.

The plasticizer composition in which the epoxidized oil and the citrate-based material are mixed may exhibit relatively poor plasticization efficiency and cold resistance among various properties thereof, but such plasticization efficiency and cold resistance may be compensated by further including the phthalate-based compound.

The phthalate-based compound may be, for example, diisodecyl phthalate (DIDP), dipropylheptyl phthalate (DPHP), diisononyl phthalate (DINP), or a mixture thereof, but the present invention is not limited thereto.

The phthalate-based compound may be appropriately included at an amount of about 10 to 100 parts by weight with respect to a mixing weight of the epoxidized oil and the citrate-based material. The phthalate-based compound included within the above range may further improve properties of the plasticizer in an industry in which environmental issues are not raised.

In the present invention, a method of preparing the plasticizer composition may be performed by a blending method, and the blending method is, for example, as follows.

An epoxidized oil and a citrate-based material are prepared and blended at a weight ratio of 1:99 to 99:1 to prepare a plasticizer composition.

The citrate-based material may be a compound represented by Chemical Formula 1. Its carbon atoms and characteristics are the same as described above, and thus a description thereof will be omitted.

The citrate-based material may be prepared by direct esterification between one or more alcohols selected from the group consisting of 2-ethylhexyl alcohol, isononyl alcohol, and propylheptyl alcohol, and citric acid.

The direct esterification may be performed by introducing citric acid to an alcohol, and then adding a catalyst thereto to induce a reaction under a nitrogen atmosphere; removing an unreacted alcohol and neutralizing an unreacted acid; and performing dehydration and filtration through distillation under reduced pressure.

Meanwhile, the catalyst used in the blending method may be, for example, one or more selected from an acid catalyst such as sulfuric acid, hydrochloric acid, phosphoric acid, nitric acid, p-toluenesulfonic acid, methanesulfonic acid, ethanesulfonic acid, propanesulfonic acid, butanesulfonic acid, alkyl sulfuric acid, and the like; a metal salt such as aluminum lactate, lithium fluoride, potassium chloride, cesium chloride, calcium chloride, iron chloride, aluminum phosphate, and the like; a metal oxide such as a heteropoly acid and the like; and an organic metal such as a natural/synthetic zeolite, cation- and anion-exchange resins, tetraalkyl titanate, a polymer thereof, and the like. As a specific example, the catalyst may be tetraalkyl titanate.

An amount of the catalyst to be used may vary according to the type thereof. For example, a homogeneous catalyst may be used at an amount of 0.01 to 5 wt %, 0.01 to 3 wt %, 1 to 5 wt % or 2 to 4 wt % with respect to 100 wt % of a total weight of the reactants, and a heterogeneous catalyst may be used at an amount of 5 to 200 wt %, 5 to 100 wt %, 20 to 200 wt % or 20 to 150 wt % with respect to the total weight of the reactants.

In this case, a reaction temperature may be in a range of 180 to 280° C., 200 to 250° C., or 210 to 230° C.

When the citrate-based material is prepared as a hybrid mixture, the citrate-based material may be prepared by preparing a citrate compound through the above-described direct esterification, and then mixing the prepared citrate compound or by trans-esterifying any one citrate compound selected from tri(2-ethylhexyl) citrate and any one alcohol selected from alcohols such as butyl alcohol, isobutyl alcohol, isononyl alcohol, and the like.

The term "trans-esterification" used herein refers to a reaction between an alcohol and an ester as shown in Reaction Formula 1, in which R" of the ester is interchanged with R' of the alcohol:

[Reaction Formula 1]

According to an exemplary embodiment of the present invention, the trans-esterification may produce three types of ester compositions according to three cases in which an alkoxide of the alcohol attacks carbons of two ester (RCOOR") groups present in an ester-based compound; an alkoxide of the alcohol attacks carbons of one ester (RCOOR") group present in an ester-based compound; and there is no reaction between an alcohol and an ester group in an ester-based compound.

In addition, compared to acid-alcohol esterification, the trans-esterification does not cause water contamination and may solve problems caused by the use of an acidic catalyst because the reaction can be performed without a catalyst.

Since, in the case of the citrate-based compound, a molar fraction of the citrate compounds participating in the trans-esterification increases as the amount of alcohol added increases, a content ratio of the citrate-based materials in the mixture may be adjusted through the amount of alcohol added.

According to an embodiment of the present invention, the trans-esterification is preferably performed at a reaction temperature of 120 to 190° C., preferably 135 to 180° C., and more preferably 141 to 179° C. for 10 minutes to 10 hours, preferably 30 minutes to 8 hours, and more preferably 1 to 6 hours. Within the above temperature and time ranges, a mixture of epoxidized oil at a desired composition ratio may be effectively obtained. Here, the reaction time may be calculated from a point of time at which the reaction temperature is reached after the temperature is risen for the reactants.

The trans-esterification may be performed under an acidic catalyst or metal catalyst, which provides an effect of reducing a reaction time.

The acidic catalyst may be, for example, sulfuric acid, methanesulfonic acid, p-toluenesulfonic acid, or the like, and the metal catalyst may be, for example, an organic metal catalyst, a metal oxide catalyst, a metal salt catalyst, or a metal itself.

A metal component of the metal catalyst may be, for example, any one or a mixture of two or more selected from the group consisting of tin, titanium and zirconium.

In addition, the method may further include removing an unreacted alcohol and a reaction by-product, for example, an ester-based compound represented by Chemical Formula 3, through distillation after the trans-esterification.

The distillation may be, for example, two-step distillation for separating the alcohol and the reaction by-product by using a difference in boiling points thereof.

In another example, the distillation may be mixed distillation. In this case, an ester-based plasticizer composition may be relatively stably ensured at a desired composition ratio. The mixed distillation refers to simultaneous distillation of butanol and a reaction by-product.

The plasticizer composition thus prepared is included at an amount of 5 to 150 parts by weight, 40 to 100 parts by weight, or 40 to 50 parts by weight with respect to 100 parts by weight of a resin selected from ethylene vinyl acetate, polyethylene, polypropylene, polyvinyl chloride, polystyrene, polyurethane, and a thermoplastic elastomer, and thus a resin composition which is effective in both compound formulation and sheet formulation may be provided.

For example, the plasticizer composition may be applied to manufacture electric wires, flooring materials, interior materials for automobiles, films, sheets, wallpaper, and tubes.

The invention claimed is:
1. A plasticizer composition comprising an epoxidized oil, and a citrate-based material, wherein a weight ratio of the epoxidized oil and the citrate-based material is 99:1 to 1:99, and wherein the citrate-based material is one or more selected from the group consisting of tri(2-ethylhexyl) citrate, triisononyl citrate, triisodecyl citrate, and tri(2-propylheptyl) citrate.

2. The plasticizer composition of claim 1, wherein the epoxidized oil is one or more selected from the group consisting of epoxidized soybean oil, epoxidized castor oil, epoxidized linseed oil, epoxidized palm oil, and epoxidized tall oil.

3. The plasticizer composition of claim 1, wherein a weight ratio of the epoxidized oil and the citrate-based material is 90:10 to 10:90.

4. The plasticizer composition of claim 3, wherein a weight ratio of the epoxidized oil and the citrate-based material is 90:10 to 25:75.

5. The plasticizer composition of claim 3, wherein a weight ratio of the epoxidized oil and the citrate-based material is 50:50 to 10:90.

6. The plasticizer composition of claim 1, further comprising a phthalate-based compound.

7. The plasticizer composition of claim 6, wherein the phthalate-based compound is one or more selected from the group consisting of diisodecyl phthalate (DIDP), diisononyl phthalate (DINP), and dipropylheptyl phthalate (DPHP).

8. A method of preparing a plasticizer composition of claim 1 comprising:

preparing an epoxidized oil and a citrate-based material; and blending the epoxidized oil and the citrate-based material at a weight ratio of 99:1 to 1:99 to obtain a plasticizer composition, wherein the citrate-based material is one or more selected from the group consisting of tri(2-ethylhexyl) citrate, triisononyl citrate, triisodecyl citrate, and tri(2-propylheptyl) citrate.

9. The method of claim 8, wherein the citrate-based material is prepared through direct esterification or trans-esterification.

10. The method of claim 8, further comprising mixing a separate phthalate-based compound after the plasticizer composition is obtained through blending.

11. A resin composition comprising 100 parts by weight of a resin; and 5 to 150 parts by weight of the plasticizer composition of claim 1.

12. The resin composition of claim 11, wherein the resin is one or more selected from the group consisting of ethylene vinyl acetate, polyethylene, polypropylene, polyvinyl chloride, polystyrene, polyurethane, and a thermoplastic elastomer.

13. The resin composition of claim 11, wherein the resin composition is a material of one or more products selected from the group consisting of electric wires, flooring materials, interior materials for automobiles, films, sheets, wallpaper, and tubes.

14. The plasticizer composition of claim 1, wherein the citrate-based material is one or more selected from the group consisting of triisononyl citrate, triisodecyl citrate, and tri (2-propylheptyl) citrate.

15. The plasticizer composition of claim 1, wherein a weight ratio of the epoxidized oil and the citrate-based material is 70:30 to 10:90.

* * * * *